Figure 1:
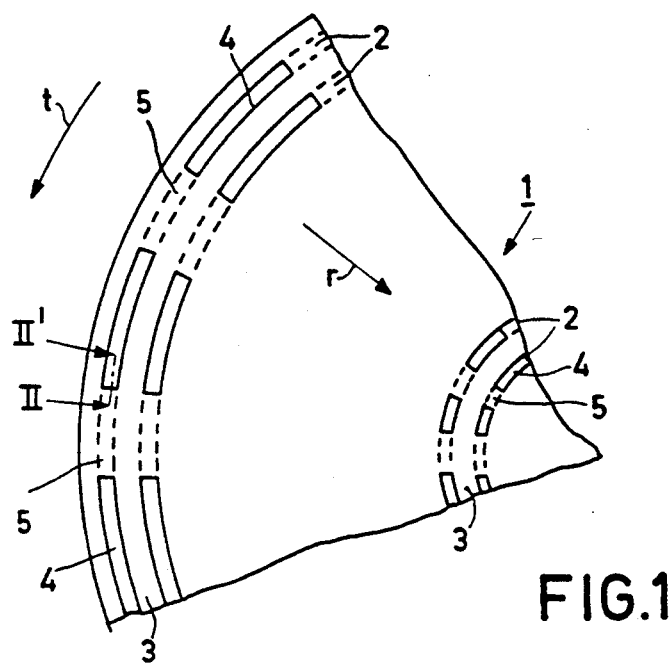

United States Patent [19]

Bulthuis

[11] Patent Number: 5,090,007
[45] Date of Patent: Feb. 18, 1992

[54] OPTICALLY INSCRIBABLE RECORD CARRIER WITH PRERECORDED INFORMATION

[75] Inventor: Kornelis Bulthuis, Eindhoven, Netherlands

[73] Assignee: U.S. Philips Corporation, New York, N.Y.

[21] Appl. No.: 296,902

[22] Filed: Jan. 9, 1989

Related U.S. Application Data

[63] Continuation of Ser. No. 370,896, Apr. 22, 1982, which is a continuation of Ser. No. 44,731, Jun. 1, 1979, abandoned.

[30] Foreign Application Priority Data

Nov. 8, 1978 [NL] Netherlands .......................... 7811086

[51] Int. Cl.$^5$ ............................................. G11B 07/013
[52] U.S. Cl. ............................................. 369/275.400
[58] Field of Search ................................. 358/341–343, 358/335; 250/201, 570, 578, 201.1, 201.4, 201.5; 369/30, 32, 33, 100, 109–111, 275.1, 275.3, 275.4, 275.2

[56] References Cited

U.S. PATENT DOCUMENTS

| | | |
|---|---|---|
| 3,510,658 | 5/1970 | Rabedean . |
| 3,673,412 | 6/1972 | Olson . |
| 3,931,457 | 1/1976 | Mes . |
| 4,094,010 | 6/1978 | Pepperl et al. . |
| 4,094,013 | 6/1978 | Hill et al. . |
| 4,142,209 | 2/1979 | Hedlund et al. . |
| 4,209,804 | 6/1980 | Dil ............................... 369/275 |
| 4,230,915 | 10/1980 | Dil et al. ........................ 369/275 |
| 4,363,116 | 12/1982 | Kleuters et al. ................ 369/32 |
| 4,930,116 | 1/1979 | Dil ............................... 369/275.1 |

FOREIGN PATENT DOCUMENTS 2048431 4/1972 Fed. Rep. of Germany .
2403013 8/1974 Fed. Rep. of Germany .

OTHER PUBLICATIONS

Kybett, "Video Tape Recorders", 1974, pp. 248–250.

Primary Examiner—Aristotelis Psitos
Assistant Examiner—Steven R. Garland
Attorney, Agent, or Firm—Algy Tamoshunas; Leroy Eason

[57] ABSTRACT

An optical record carrier having an information track structure on a surface thereof, one or more of the tracks being pre-recorded with standard information pertaining to a particular class of information of common use to an undefined number of users. Portions of one or more tracks which are not so pre-recorded are covered with a layer of optically recordable material, for recording thereon of information of the aforesaid class which completes or updates the standard information in whole or in part.

8 Claims, 4 Drawing Sheets

OPTICALLY INSCRIBABLE RECORD CARRIER WITH PRERECORDED INFORMATION

This is a continuation of application Ser. No. 370,896, filed Apr. 22, 1982, which is a continuation of application Ser. No. 044,731, filed June 1, 1979, which prior applications have been abandoned.

The invention relates to a record carrier comprising a substrate having on at least one side a layer which is inscribable with optical radiation by a user with information which specifically serves the user's purpose.

For some years it has been known to record a video or an audio program in an optically readable information structure of track-wise arranged areas which alternate with intermediate areas. Especially in the case of an information structure with a relief structure wherein the information areas are situated at a different level in the record carrier from that of the intermediate areas, the optical record carrier is extremely suitable as a medium for large-scale dissemination of video and/or audio programs. The relevant program need only be inscribed once on a so-called "master", by optical means, and this master may then be copied in large quantities using techniques, which are known per se from the manufacture of mechanically scanned audio discs.

Such an optical record carrier has a high information density and a short access time. Furthermore, there is no mechanical contact between the optical read head and the record carrier during reading, so that there is no wear of the record carrier nor the read head. Therefore, the optical record carrier is also highly suitable as a medium for storage of information other than video or audio information, and especially as a storage medium to be provided with information by the user himself. This information may be digital data supplied by an (office) computer, pictorial information such as radiograms made in a hospital, or other data, such as administrative or medical data about patients.

In U.S. application Ser. No. 127,354 of Kramer et al, filed Mar. 5, 1980 and assigned to the present assignee, and which after subsequent continuations issued on Feb. 21, 1989 as U.S. Pat. No. 4,807,209, a record carrier has been proposed in which the user himself can record information with the aid of an optical radiation beam, i.e. a beam of electromagnetic radiation whose wavelength lies in the range extending from infrared to ultraviolet. This record carrier is perfectly "blank", i.e. it contains no information which is specifically useful to the user. However, the record carrier does contain servo information. In general servo information is to be understood to mean information used by the write apparatus to control the write process. The servo information in the record carrier in accordance with aforementioned patent takes the form of a continuous follow-on track which is employed to record the information which is useful to the user in a spiral track with a constant pitch.

There are applications of an optical record carrier where different users require a certain amount of standard information which is not servo information. This standard information is supplemented by the individual user with information which is of specific use to him. Should a blank record carrier be supplied to the user, he would first have to record the standard information and only after this has been done can the information intended for individual use be recorded on the carrier. Recording the standard information thus demands additional time and effort on the part of the user.

It is an object of the present invention to mitigate this drawback. To this end the record carrier in accordance with the invention is characterized in that the record carrier contains a certain amount of standard information, which is useful to users, in a performed track-shaped optically readable information structure. The structure containing standard information occupies only a part of the surface area of the information-carrying side of the record carrier, and that surface area comprises informationless or blank portions on which information may be inscribed by the user.

The informationless or blank portions are those which do not contain information which is of specific use to the user. These portions may contain servo information, for example, in the form of an optically detectable continuous groove.

The standard information may be optically inscribed in a so-called "master" at one central location, and this master can then be used to make a large number of copies with known techniques. After being provided with an inscribable layer these copies, or record carriers, may be supplied to the users. The individual user then merely needs to record the information which is specifically useful to him, so that he can save a substantial amount of time and effort.

It is to be noted that U.S. patent application Ser. No. 140,409 filed Apr. 14, 1980 and assigned to the assignee of the present application, which issued as U.S. Pat. No. 4,363,116 to Kleuters et al, dated Dec. 7, 1982, (the "Kleuters patent"), describes a record carrier which is provided with a so-called servo track. This servo track comprises optically detectable continuous track portions in which information can be written. Each continuous track portion has an associated so-called "sector address" in which, in addition to any further data, the address of the associated continuous track portion is stored in an optically readable structure. The data stored in a sector address are used only in the write-/read apparatus for a correct control which ensures that the various blocks of information applied to the apparatus are written at the correct locations. The sole function of these data is to control the write/read apparatus and therefore are not "information which is useful to the user" as that term is used herein.

In the record carrier in accordance with the invention the standard information structure may be located at a specific part of the record carrier surface, while the informationless parts are then located at a different part of that surface. Thus, in the case of a round disc-shaped record carrier, the standard information may be located near the periphery of the record carrier surface, so that the user can record the desired information on the inner part of the record carrier surface.

Preferably, the record carrier in accordance with the invention is further characterized in that the standard information structure extends over an entire record carrier surface and that the informationless parts, which are inscribable by the user, are contained in said information structure.

The informationless parts, which are inscribable by the user, may then be located in the tracks of the standard information structure.

It is alternatively possible that the informationless parts, which are inscribable by the user, comprise informationless tracks which are disposed between the tracks of the standard information structure. One informationless track, which is inscribable by the user, may then be disposed between two adjacent tracks of the standard information structure. It is alternatively possible to provide two or more informationless tracks, which are inscribable by the user, between two adjacent tracks of the standard information structure.

Figure 2:
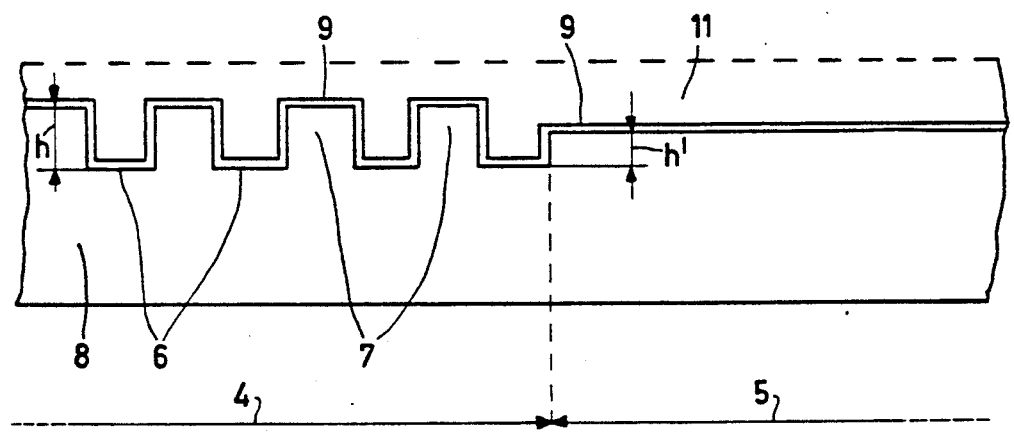
Figure 3:
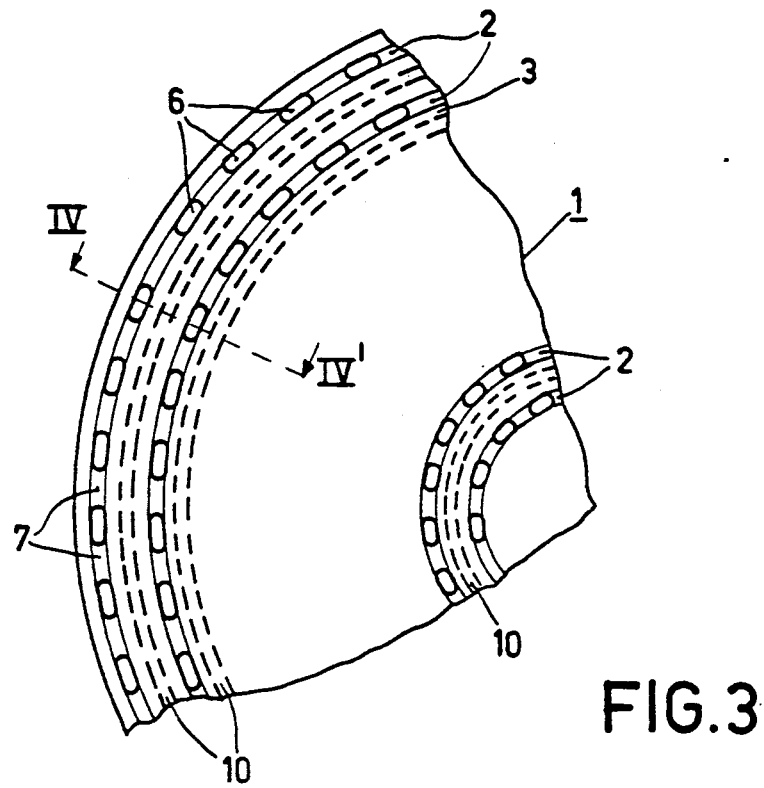
Figure 4:
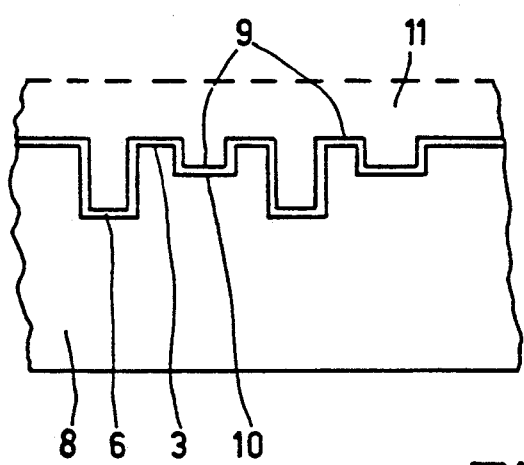
Figure 5:
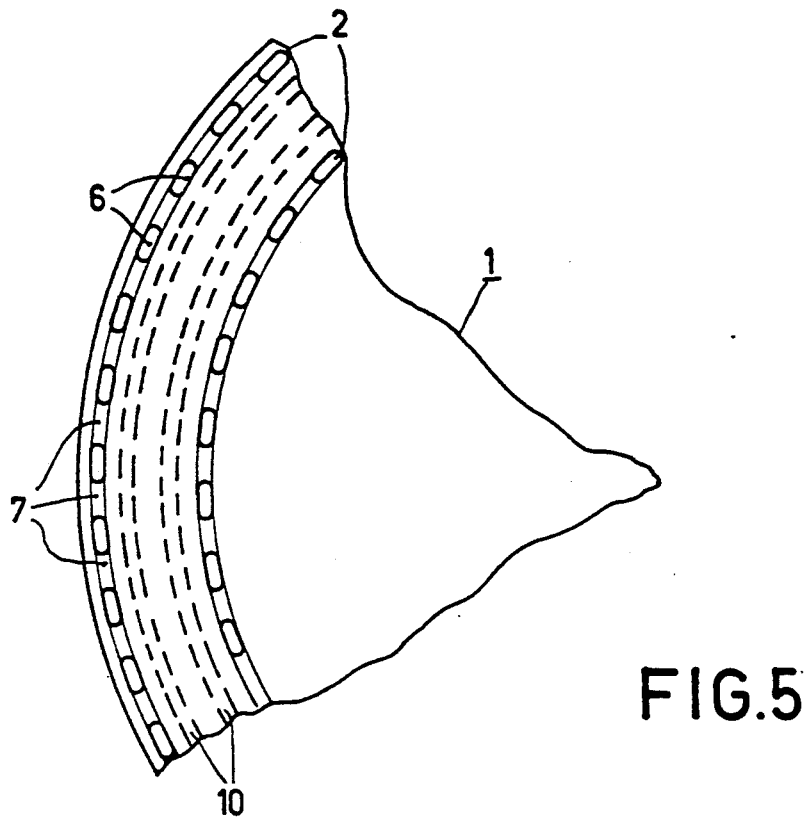
Figure 6:
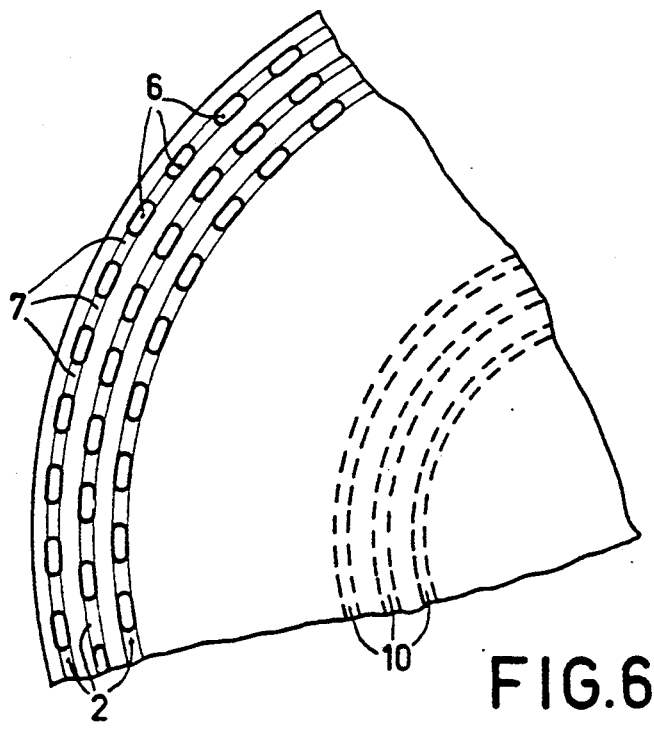

The invention will be described in more detail with reference to the drawings wherein:

FIG. 1 shows a plan view of a part of a first embodiment of a record carrier in accordance with the invention, FIG. 2 is a tangential cross-section of said record carrier, FIG. 3 is a plan view of a part of a second embodiment of a record carrier in accordance with the invention, FIG. 4 shows a radial cross-section of this record carrier, FIG. 5 is a plan view of a part of a third embodiment of a record carrier in accordance with the invention, and FIG. 6 is a plan view of a part of a fourth embodiment of a record carrier in accordance with the invention.

Figure 7:
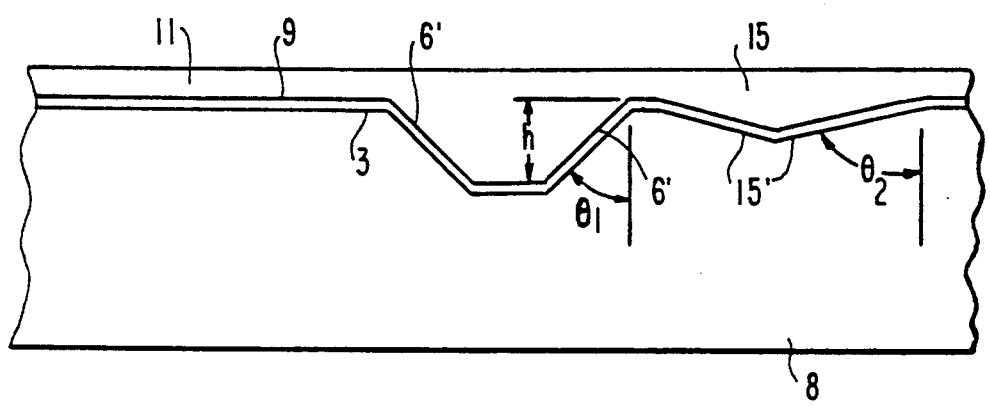

FIG. 7 shows a radial cross-section of another embodiment of the record carrier in accordance with the invention.

As shown in FIG. 1, the record carrier 1 in accordance with the invention is provided with an amount of standard information which is contained in the track portions 4. These track portions alternate with "blank" track portions 5 in the tangential direction t, in which the user can record information. The track portions 4 and 5 constitute the tracks 2. In the radial direction r the tracks 2 are spaced from each other by lands 3. The tracks 2 may be concentric tracks. Preferably, the tracks 2 are quasiconcentric continuous tracks which form one spiral track.

The standard information structure in the track portions 4 comprises information areas which alternate with intermediate areas in the tangential direction. The information areas may differ from the intermediate areas in that they have a different transmission or reflection coefficient, so that the information structure is an amplitude structure. However, preferably the information structure in a track portion 4 is a relief structure or a phase structure, the information areas comprising pits formed in the record carrier surface as is shown in FIG. 2 or hills which project from the record carrier surface.

FIG. 2 shows a tangential cross-section of the record carrier taken on the line II—II' of FIG. 1. In FIG. 2 the information areas are designated 6 and the intermediate areas 7. The substrate of the record carrier is designated 8. The width, i.e. the dimension in the radial direction r, of the information areas is substantially constant, and so is the depth of these areas. The information is stored in the sequence of the information areas and intermediate areas in the track direction. The information may for example be encoded in the spatial frequency of the areas 6 and, as the case may be, the lengths of these areas. It is alternatively possible that the information is digitally coded. In that case the information areas may have standard dimensions and a specific combination of information areas and intermediate areas represents a specific combination of digital zeros and ones.

Each track portion 4 is followed by a blank track portion 5. The track portions 5 should be provided with a material in which radiation of sufficiently high energy, for example laser radiation, produces an optically detectable change. As described in the above-mentioned Kleuters patent, the entire information side of the record carrier may be covered with a layer 9, which on the one hand is sufficiently reflecting to enable the standard information to be read in reflection, and, on the other hand, is sufficiently energy-absorbing so as to enable recording. The layer 9 may for example consist of bismuth or tellurium in which pits can be melted by a radiation beam of sufficiently high intensity such as a laser beam. It is alternatively possible for the user to record information using the magneto-optical effect, in which case the blank track portions 5 should be covered with a magneto-optical material. The blank track portion 5 may also be covered with other photosensitive layers, such as a colored nitrocellulose or a gelatine layer, the layer being locally decolorized as a result of the decomposition of the colorant under the influence of laser radiation.

The write/read apparatus, produces a radiation beam whose intensity can be switched to a number of levels. After the record carrier has been placed in the apparatus the intensity of the radiation beam is set to a low level, the read level, and track portions 4 are read. In addition to standard information these track portions may also contain addresses. If the user wishes to add information to the information already contained in a track portion 4, after the track portion 4 has been read the radiation beam is switched between a high or write level and a low level in accordance with the information to be written, so that for example pits are melted in the layer 9. By locally melting the layer 9 an optically readable information structure is produced in a track portion 5, which may be regarded as an amplitude structure, i.e. a structure which influences the amplitude of an incident radiation beam.

FIG. 3 shows a plan view and FIG. 4 a radial cross-section taken on the line IV—IV' in FIG. 3 of a second embodiment of a record carrier in accordance with the invention. In this record carrier tracks 2 may contain only standard information. Located between tracks 2 are "blank" tracks 10, represented by dashed lines, in which the user may record information which is useful to him, and which is associated with the standard information of an adjacent track 2, in a similar way as in the record carrier in accordance with FIGS. 1 and 2.

Alternatively only portions of track 2 may be provided with standard information and the remaining portions of this track are blank and inscribable. Associated with this track 2 is then a blank track 10 which is completely inscribable by the user. In that case the user can record a large amount of information per block of standard information in a track 2.

In the embodiment in accordance with FIG. 5 two blank tracks 10, inscribable by the user, are provided between two standard information tracks 2. Obviously, it is also possible to provide three or more blank tracks 10 between two adjacent tracks 2. This embodiment of the record carrier would be used when the user wishes to record a large amount of information per standard information track.

FIG. 6 shows an embodiment of the record carrier on which the standard information structure is disposed near the periphery of the record carrier. The blank tracks 10 are located at the inner part of the record carrier. The location of the tracks 2 and the tracks 10 may also be interchanged.

Preferably, the information surface is illuminated through the substrate both when writing information and when reading standard information and user-recorded information. For the record carriers in accordance with FIGS. 2 and 4 this means that they have to be illuminated from the underside and that they have to be illuminated from the underside and that the information areas 6 are hills. On the reflecting layer a layer 11 may then be deposited which provides protection against mechanical damage. The information layer is then protected against dust particles, scratches and the like.

The record carrier may also be double sided, i.e. two discs in accordance with FIGS. 2 and 4 are glued to each other at the periphery, an annular spacer being interposed. The protective layer 1 s then dispensed with and the discs face each other with the layers 9. Such a "sandwich-like" record carrier may contain both a large amount of standard information and a great length of blank tracks 10 or track portions 5.

A record carrier in accordance with the invention may be utilized in different ways, some of which are described hereinafter by way of example.

The record carrier may, for example, be used as a file in which all kinds of notes and letters may be stored. The standard information then divides the record carrier into a number of fields or subjects. The write/read apparatus is connected to a data entry device such as keyboard or writing tablet. For entering a specific document first of all the field to which the document belongs is entered, so that the radiation beam is automatically directed to a blank part of the relevant field on the record carrier. Subsequently, the document may be entered via the keyboard or the writing tablet. If use is made of a writing tablet, hand-written information or a drawing may also be entered.

It is alternatively possible that the standard information comprises all or part of all telephone numbers of a country. For each telephone number a specific space is then reserved on the record carrier in which the user can record relevant information associated with telephone numbers which are important to him.

For these and other applications the amount of information which can be stored on the record carrier presents no problem at all. The record carrier may for example comprise 45,000 tracks within an annular area having an inner radius of approximately 7 cm and an outer radius of for example 14 cm. The period of the track structure in the radial direction is for example 1.6 μm at a track width of for example 0.6 μm. The average length, in the track direction, of the information areas 6 and of the information areas recorded by the user is for example 0.6 μm. On one side of such a record carrier an amount of information of the order of $7 \times 10^9$ bits may then be stored.

Furthermore, the record carrier may be employed for educational purposes. The standard information then consists of a specific teaching program. A specific part of a lesson may then be closed with some questions to the student. The student may record his answers to the questions in a blank portion which follows that part of the lesson. The record carrier with the student's answers may then be checked by a supervisor. The write/read read apparatus may be adapted so as to allow the supervisor to display only the student's answers on a monitor.

A last example of an application of the record carrier is its use as an instruction source in an automated measuring process or test process. The write/read apparatus may then be connected to a plurality of measuring or test devices which measure specific functions or parameters in a specific process or of an object to be examined. The result of a specific measurement or test may then be recorded in a blank portion associated with the relevant instruction. In this case one user will employ a large number of record carriers with the same standard information.

The measuring or test process need not be an automated process. The process may also comprise measurements or tests conducted by a person. This person may then each time display a subsequent test or measuring instruction on a monitor of the write/read apparatus. The result obtained after the instruction has been carried out is applied to the write/read apparatus so as to be recorded on the part of the record carrier reserved for this purpose.

In the foregoing reference has been made repeatedly to a write/head apparatus. For such apparatus reference is made to said Kleuters patent, which is incorporated herein by reference. The apparatus described in that application is intended for writing information on a record carrier which only contains servo-tracks with sector addresses as optically readable information. The track portions 4 (FIG. 1) or the blank tracks 10 (FIGS. 3, 5 or 6) of the record carrier in accordance with the invention are optically read in the same way as the sector addresses of the record carrier in accordance with said Kleuters patent. The processing of the standard information read is similar to that of the sector-address information read. The apparatus in accordance with the Kleuters patent, as the case may be with minor adaptations, is therefore suitable as write/read apparatus for a record carrier in accordance with the invention. In addition to the means for reading the previously recorded standard information and the information recorded by the user and for recording the information, this apparatus also comprises means for checking the information just recorded, and furthermore servo-mechanisms for the tracking of the radiation spot formed on the information layer, the focussing of the radiation beam on the information layer, and for the tangential speed of the radiation spot relative to a track.

The information written can be checked immediately after writing, for example with the aid of an additional radiation spot which follows the write spot at a short distance.

In the apparatus in accordance with said Kleuters patent, one radiation beam is produced, which is consecutively used as a read beam and as a write beam. It is alternatively possible to use a separate read beam and a separate write beam. This is especially attractive in the case of a record carrier in accordance with FIGS. 3, 4, 5 and 6. Furthermore, the write/read apparatus may also employ several beams, which may each be used as write beam and as read beam.

Also when a radiation beam moves over a track portion 5 of FIG. 1 or a blank track of FIGS. 3, 5, 6 care must be taken that the center of the radiation spot formed by the beam always coincides with the center of a track. For this purpose the track portions 5 or the tracks 10 should optically differ from the lands 3. As is shown in FIGS. 2 and 4, the track portions 5 and the blank tracks 10 may consist of continuous grooves in the surface of the record carrier.

The structure on a record carrier supplied to a user may be regarded as a grating which splits a radiation beam into a number of difraction orders, to which orders a specific phase and amplitude may be attributed.

For reading the standard information and the information recorded by the user and for following a blank track portion 5 or a blank track 10 mainly the zero order subbeams and the first order subbeams are of importance. Since some time the Applicant has been using the concept of "phase depth". This phase depth is defined as the difference between the zero and one of the first spectral order phases.

When reading the standard information and information recorded by the user the so-called "central aperture" method is preferably used. The variation of the total radiation intensity coming from the record carrier and transmitted by the pupil of an objective system which is located between the record carrier and the radiation sensitive detection system is then determined. It has been found that an optimum information signal is obtained using this read method if the phase depth is approximately 180°.

For following a blank track 10 or a track portion 5 the so-called "push-pull" method is preferred. The difference between the radiation portions passing through two pupil halves of the objective system is then detected. The bounding line of the pupil halves in the case of tracking is effectively parallel to the track direction. It has been found that this read method yields a optimum tracking signal if the phase depth of the blank tracks 10 or of the track portions 5 has a value between 95° and 145°.

If the standard information is to be read in the push-pull mode, the information areas of the standard information structure should have a phase depth in the range from 95° to 145°. Then the difference of the radiation portions passing through tangentially different pupil halves is determined.

For the reflecting phase structure with steep walls shown in FIGS. 2 and 4 the phase depth of 180° is obtained if the height of the information hills is $\lambda/4N$, while the optimum value, for reading in push-pull, of the height h' of a track portion 5 or of a track 10 is $\lambda/8N$. In this case $\lambda$ is the wavelength of the radiation beam and N the refractive index of the transparent substrate. If the radiation beam is produced by an AlGaAs diode laser, for which $\lambda = 860$ nm, and if $N = 1.5$, the height A of the information hills is approximately 145 nm and the height h' of the track portions 5 or of the tracks 10 is approximately 72 nm.

In order to ensure that an optimum tracking signal is obtained by the push-pull method when the standard information is read in the central-aperture mode, the intermediate areas within the part with standard information preferably consist of pits or hills with a phase depth which lies between 95° and 145°, i.e. smaller than the phase depth of the information areas. Reference can be made to U.S. patent application Ser. No. 006,613, filed Jan. 26, 1979, since issued as U.S. Pat. No. 4,930,116 to Dil, dated May 29, 1980 (the "Dil patent"), which is incorporated herein by reference. Such patent, inter alia, describes a largely blank record carrier, which only contains sector addresses. The intermediate areas within the sector addresses described in that patent are designed for an optimum tracking signal and may also be used in the standard-information parts of the record carrier in accordance with the present invention.

The afore-mentioned values for the height h and the height h' are valid in the case that the angles of inclination of the walls of the information areas and of the walls of the track portions 5 or the tracks 10 are 0°. The term angle of inclination is to be understood to mean the acute angle between these walls and the normal to the information structure.

As indicated in the aforesaid Dil patent, the servo information areas within the sector addresses in practice will have oblique walls with an angle $\theta$ of inclination between 30° and 65°, while the blank portions of the servo track are V-shaped grooves with an angle of inclination between 80° and 85°. In order to obtain an optimum tracking signal by means of these grooves they should have a phase depth which lies between 100° and 110°. This optimization of the optical structure may also be applied to the record carrier in accordance with the present invention. This results in a record carrier shown in FIG. 7 wherein the angle $\theta_1$ of inclination between the walls 6' of the information areas and the normal to the record carrier has a substantially constant value in the range from 30° to 65°. The geometrical height h of the information areas has a substantially constant value in the range from 165/N nm to 270/N nm, N being the refractive index of a transparent medium 11 which covers the information surface, and that the informationless parts consist of substantially V-shaped grooves 15 whose walls 15' have a substantially constant angle $\theta_2$ of inclination in the range from 80° to 85° and with a substantially constant phase depth in the range from 100° to 110°.

Finally, the aforesaid Dil U.S. Pat. No. 4,930,116 states that the intermediate areas within the sector addresses should also be V-shaped with an angle of inclination between 80° and 85° and a phase depth between 100° and 110°. When this measure is applied to a record carrier in accordance with the present invention, a record carrier is obtained which is further characterized in that the intermediate areas in the parts with standard information are substantially V-shaped with a substantially constant angle of inclination between 80° and 85° and with a substantially constant phase depth between 100° and 110°.

The invention has been described on the basis of a round disc-shaped record carrier. However, the invention may equally be applied to other record carriers, such as tape-like or cylindrical optical record carriers.

What is claimed is:

1. A record carrier on which information can be recorded and read by optical read/write apparatus producing a beam of optical radiation which scans the record carrier, comprising:

a transparent substrate having on at least one surface thereof an information structure in the form of a succession of tracks, a plurality of said tracks having control signals pre-recorded thereon which are detectable by said read/write apparatus during scanning thereof, such control signals providing information for controlling the scanning speed and tracking of said apparatus and for identifying the positions of the respective tracks;

one or more of said tracks having standard information pre-recorded thereon which is readable by said apparatus during scanning thereof, said standard information pertaining to a particular class of information of common use to an undefined number of users of said record carrier other than information of the kind provided by said control signals;

the standard information on a track being pre-recorded thereon in the form of a plurality of information areas spaced from each other in the track direction by intermediate areas which optically differ from the information areas, so that upon scanning with a read beam produced by said apparatus the sequence of information areas and intermediate areas modulates reflected radiation from such track in accordance with the standard information represented by such areas and thereby enables readout of such information by said apparatus for display or further processing by the user;

said information areas being pits in said one surface having a geometrical depth between 165/N nm and 270/N nm, N being the refractive index of a transparent medium in said pits, the walls of said pits being inclined at an angle of 30° to 65° with respect to a normal to said one surface of said record carrier; and one or more of said tracks have at least portions thereof which are not pre-recorded with said standard information and which are covered with a layer of material which is recordable by a write beam of optical radiation produced by said apparatus, such non-pre-recorded track portions being for user recording thereon of information of said particular class which completes or updates said standard information in whole or in part.

2. The record carrier according to claim 1 wherein said standard information is pre-recorded in the form of blocks of said information areas and intermediate areas, said blocks being spaced from each other in the track direction by said non-pre-recorded track portions.

3. The record carrier according to claim 1, wherein said blocks of pre-recorded standard information are in a plurality of tracks which are generally parallel and spaced apart, and said non-pre-recorded track portions are in tracks which are disposed between said tracks which have pre-recorded standard information thereon.

4. The record carrier according to any of claims 1, 2 or 3, further comprising a reflective layer extending over said pits and said intermediate areas.

5. The record carrier according to claim 4, wherein said pits and intermediate areas are configured so as to split up the radiation reflected by said reflective layer into a zero order diffracted subbeam and at least a first order diffracted subbeam having a phase difference therebetween of approximately 180°.

6. The record carrier according to claim 5, wherein said intermediate areas are depressions in said one surface having a depth smaller than the depths of said pits therein.

7. The record carrier according to claim 1, wherein said non-pre-recorded portions of said tracks are substantially V-shaped grooves, the walls of said grooves being inclined at an angle of 80° to 85° with respect to said normal to said one surface of said record carrier.

8. The record carrier according to claim 1, wherein said intermediate areas are substantially V-shaped grooves, the walls of said grooves being inclined at an angle of 80° to 85° with respect to said normal to said one surface of said record carrier.

* * * * *